US008722169B2

(12) United States Patent
Corver

(10) Patent No.: US 8,722,169 B2
(45) Date of Patent: May 13, 2014

(54) FREEZE DRYER SHELF

(75) Inventor: Jozef Antonius Willem Maria Corver, NE Dongen (NL)

(73) Assignee: Ima Life S.r.l., Ozzano dell'Emilia (IT)

( * ) Notice: Subject to any disclaimer, the term of this patent is extended or adjusted under 35 U.S.C. 154(b) by 803 days.

(21) Appl. No.: 12/267,466

(22) Filed: Nov. 7, 2008

(65) Prior Publication Data

US 2009/0178293 A1 Jul. 16, 2009

Related U.S. Application Data

(63) Continuation of application No. PCT/EP2007/003352, filed on May 8, 2007.

(30) Foreign Application Priority Data

May 9, 2006 (GB) .................................. 0609113.6

(51) Int. Cl.

| | |
|---|---|
| ***B32B 18/00*** | (2006.01) |
| ***B32B 27/06*** | (2006.01) |
| ***B32B 27/30*** | (2006.01) |
| ***F26B 25/08*** | (2006.01) |
| ***B32B 3/10*** | (2006.01) |
| ***B32B 3/12*** | (2006.01) |
| ***B32B 3/30*** | (2006.01) |
| ***B32B 5/16*** | (2006.01) |
| ***F26B 5/04*** | (2006.01) |
| ***F26B 5/06*** | (2006.01) |
| ***F26B 13/24*** | (2006.01) |
| ***F26B 13/30*** | (2006.01) |

(52) U.S. Cl.

USPC ................ 428/72; 428/68; 428/76; 428/105; 428/116; 428/137; 428/138; 428/188; 428/209; 428/210; 428/221; 428/421; 428/422; 428/457; 428/461; 428/463; 428/688; 428/698; 34/92; 34/239; 34/284

(58) Field of Classification Search

None

See application file for complete search history.

(56) References Cited

U.S. PATENT DOCUMENTS

| | | | | |
|---|---|---|---|---|
| 3,264,756 | A * | 8/1966 | Fuentevilla | 34/237 |
| 3,271,653 | A * | 9/1966 | Wolf | 220/573.2 |
| 3,419,414 | A * | 12/1968 | Marks | 428/601 |

(Continued)

FOREIGN PATENT DOCUMENTS

| | | |
|---|---|---|
| CN | 1557247 | * 12/2004 |
| DE | 20212324 | * 12/2002 |

(Continued)

OTHER PUBLICATIONS

International Search Report for PCT/EP2007/003352 mailed on Sep. 18, 2007.

(Continued)

*Primary Examiner* — Vivian Chen

(74) *Attorney, Agent, or Firm* — Knobbe Martens Olson & Bear LLP

(57) ABSTRACT

A freeze dryer shelf with opposed, parallel first and second plates is disclosed. The plates have at least one flow channel located therebetween for conveying a diathermic fluid between the plates. One of the plates has a surface treated to inhibit the sticking to the shelf of a rubber stopper pressed against that surface during the application of pressure to the stopper to push the stopper into a container.

9 Claims, 3 Drawing Sheets

(56) References Cited

U.S. PATENT DOCUMENTS

| | | | | | |
|---|---|---|---|---|---|
| 3,448,556 | A | | 6/1969 | Taggart | |
| 3,545,097 | A | * | 12/1970 | Waltrich | 34/238 |
| 3,837,895 | A | * | 9/1974 | Pryor et al. | 428/422 |
| 3,876,729 | A | * | 4/1975 | Mueller | 525/276 |
| 4,109,396 | A | * | 8/1978 | Fraser | 34/192 |
| 4,204,021 | A | * | 5/1980 | Becker | 428/325 |
| 4,311,755 | A | * | 1/1982 | Rummel | 428/312.6 |
| 4,434,197 | A | * | 2/1984 | Petriello et al. | 427/407.1 |
| 4,897,439 | A | * | 1/1990 | Rau et al. | 524/404 |
| 4,993,171 | A | | 2/1991 | Renzi | |
| 5,037,675 | A | * | 8/1991 | Kishi et al. | 427/258 |
| 5,411,771 | A | * | 5/1995 | Tsai | 427/456 |
| 5,519,946 | A | * | 5/1996 | Renzi | 34/239 |
| 5,545,439 | A | * | 8/1996 | Deng et al. | 427/327 |
| 5,689,898 | A | * | 11/1997 | Renzi | 34/239 |
| 5,701,745 | A | * | 12/1997 | Cheng et al. | 62/51.1 |
| 5,718,963 | A | * | 2/1998 | Batzar | 428/141 |
| 5,728,455 | A | * | 3/1998 | Batzar | 428/216 |
| 5,827,573 | A | * | 10/1998 | Tsai | 427/327 |
| 5,874,489 | A | * | 2/1999 | D'Haenens et al. | 523/205 |
| 6,123,999 | A | * | 9/2000 | Felix et al. | 427/449 |
| 6,291,054 | B1 | * | 9/2001 | Thomas et al. | 428/141 |
| 6,326,437 | B1 | * | 12/2001 | Tsuda et al. | 525/276 |
| 6,359,030 | B1 | * | 3/2002 | Tsuda et al. | 523/201 |
| 6,403,213 | B1 | * | 6/2002 | Huesmann | 428/325 |
| 6,541,552 | B1 | * | 4/2003 | Tsuda et al. | 524/261 |
| 6,638,600 | B2 | * | 10/2003 | Gazo et al. | 428/141 |
| 6,797,223 | B2 | * | 9/2004 | Beale et al. | 264/337 |
| 6,846,504 | B1 | * | 1/2005 | Yarnell | 426/523 |
| 7,041,340 | B2 | * | 5/2006 | Kittle et al. | 427/459 |
| 7,261,925 | B2 | * | 8/2007 | Nesbitt | 427/470 |
| 7,488,515 | B2 | * | 2/2009 | Groll | 427/294 |
| 2006/0272511 | A1 | * | 12/2006 | Dreimann et al. | 99/372 |
| 2008/0105689 | A1 | * | 5/2008 | Ren et al. | 220/573.2 |

FOREIGN PATENT DOCUMENTS

| | | | | |
|---|---|---|---|---|
| EP | 1 774 885 | | * | 4/2007 |
| GB | 922 493 | A | | 4/1963 |
| GB | 2 284 468 | | * | 6/1995 |
| JP | 57016776 | A2 | | 1/1982 |
| JP | 2001-340425 | | | 12/2001 |
| JP | 2002-331018 | | | 11/2002 |
| WO | WO 2006/013360 | A | | 2/2006 |

OTHER PUBLICATIONS

O'Neil et al., The Merck Index, 13th Edition, p. 1362, entry No. 7665 Polytetrafluoroethylene, Merck & Co., Inc., Whitehouse Stations, NJ, 2001.

* cited by examiner

FREEZE DRYER SHELF

RELATED APPLICATIONS

This application is a continuation of PCT/EP2007/003352, filed May 8, 2007, which was published in English and designated the U.S., and claims priority to GB 0609113.6 filed May 9, 2006, each of which are included herein by reference.

BACKGROUND

Field

The field relates to a freeze dryer shelf, and to a method of manufacturing a freeze dryer shelf.

Freeze dryer shelves are located within a freeze drying chamber of a freeze dryer for receiving a plurality of containers or vials containing the product to be freeze dried. The chamber usually includes a number of shelves, each of which can be raised and lowered within the chamber. To load the shelves, the shelves are initially collapsed in the lower portion of the chamber, and the uppermost shelf is first moved into a loading position. After that shelf has been loaded, the mechanism automatically raises the loaded shelf to enable the next shelf to be moved to the loading position. This moving sequence continues until the chamber loading has been completed. To unload the chamber, the loading sequence is reversed, with the lowermost shelf being unloaded first.

The shelves also serve to transfer heat between a diathermic fluid such as alcohol, glycol, or silicone oil, and the products to be freeze-dried. During the freeze drying process, moisture present within the products is frozen. An external refrigeration circuit cools diathermic fluid circulating within the freeze dryer shelves in order to cause heat to be transferred from the products to the diathermic fluid and thereby cause the freezing of the moisture contained within the products. After freezing, the chamber is evacuated to a pressure typically below 1 mbar, and the diathermic fluid is heated by an external heater to cause the ice within the samples to sublimate into water vapor.

The shelves of a freeze dryer are also commonly used to press stoppers into the containers. During the freeze drying process, the stoppers are loosely located on the mouths of the containers to enable the water vapor to sublimate from the samples. Upon completion of the freeze drying process, the shelves are moved relative to each other so that the upper surfaces of the stoppers of the containers located on one shelf contact the lower surface of the shelf thereabove. Continued relative movement of the shelves depresses the stoppers into the containers to form air-tight seals. This has the advantage of sealing the containers within a controlled environment.

Freeze dryer shelves are typically formed by two opposed, stainless steel plates having stainless steel ribs located between the plates in order to form both a space, typically between 10 and 20 mm in height, between the plates and flow channels for the diathermic fluid. The ribs serve to provide the necessary strength for the shelf to support its own weight and the weight of the containers placed thereupon. In addition, the ribs must enable the shelf to withstand the forces placed upon the plates during the depression of the stoppers, which can be up to 1.5 kg/cm$^2$.

The stoppers of the containers are generally formed from a rubber material, for example a butyl rubber, and may contain an amount of silicone oil applied to the stopper to aid the insertion of the stopper into the container. The pressure placed on a stopper during the depression of the stopper into a container can drive small molecules of silicone oil to the external surface of the stopper, creating a quasi-viscous layer at the interface between the stopper and the freeze dryer surface. Furthermore, a number of stopper designs, especially those for containers containing pharmaceutical samples, have a centrally located, raised target ring, or "bulls-eye", defining a target area for needle insertion. When such a stopper is depressed into a container by the lower surface of a freeze dryer shelf, the force acting on the target ring causes the target area to bend downwardly, creating a vacuum cavity between the stopper and the freeze dryer shelf.

These effects, either alone or in combination, can cause a stopper to "stick" to the lower surface of a freeze dryer shelf during a container closure procedure, particularly when the pressure is applied to the stopper for a relatively long time, or when the closure pressure is relatively high. Consequently, when the pressure is subsequently relieved from the stoppers by the relative movement between the freeze dryer shelves, any stoppers that have stuck to the upper shelf during the closure procedure can remain attached to the upper shelf, causing the containers within which those stoppers are located to become physically separated from the lower shelf. As the adhesion between these stoppers and the lower surface of the upper shelf weakens with time, these containers can fall from the upper shelf, causing the container to break upon impact with the lower shelf and/or to knock over some of the other containers located on the lower shelf. Alternatively, these containers can be dislodged from the upper shelf during the unloading procedure, which can also cause the container to break and/or to knock over some of the other containers Any fallen containers or broken glass can block the unloading system, thereby requiring operators to clear the system, incurring costly downtime and loss of material.

SUMMARY OF CERTAIN INVENTIVE ASPECTS

Features described above in relation to method aspects of the invention are equally applicable to any of the apparatus (shelf or dryer) aspects, and vice versa.

BRIEF DESCRIPTION OF THE DRAWINGS

Preferred features of the present invention will now be described with reference to the accompanying drawings, in which.

DETAILED DESCRIPTION OF CERTAIN INVENTIVE EMBODIMENTS

Figure 1:
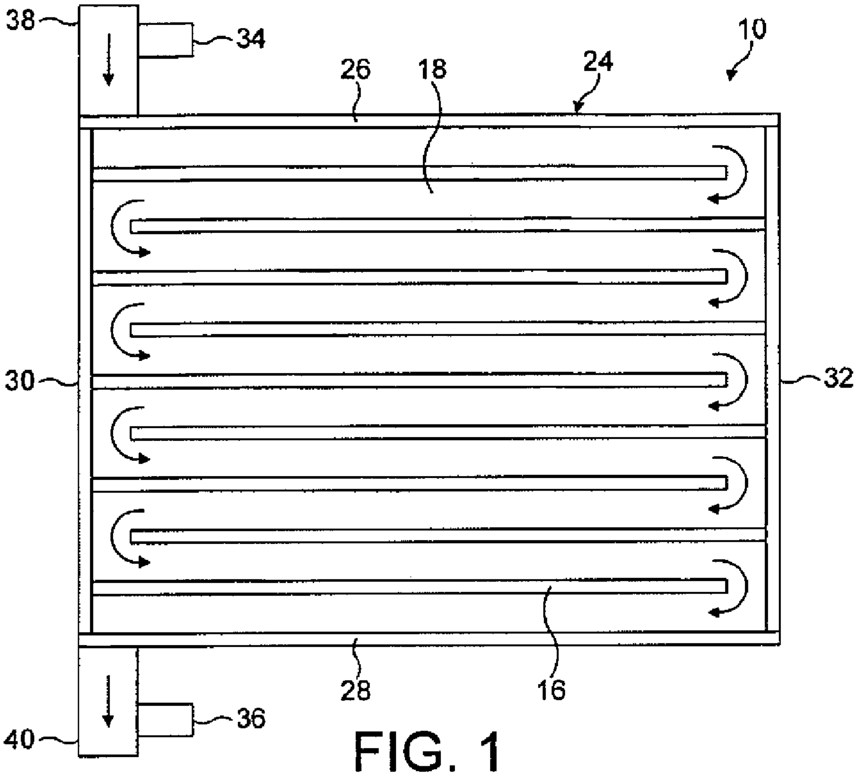
FIG. 1 is a top plan view of a freeze dryer shelf with one plate broken away.

Some embodiments include a method of manufacturing a freeze dryer shelf having opposed. The method includes a step of treating a surface of one of the plates to inhibit the sticking thereto of a rubber stopper pressed against that surface during the application of pressure to the stopper to push the stopper into a container.

By treating a surface of the shelf in this manner so that, when the shelf is located in a freeze dryer, the surface of the shelf faces the stoppers of the containers located on another shelf, the sticking of the stoppers to the shelf when the shelf is used to press the stoppers into the containers can be inhibited. This is advantageous to the individual treatment of the upper surfaces of the stoppers for the containers, as it can enable the freeze dryer to be used with a wide range of different stoppers.

In one embodiment, the surface is treated by the formation thereon of a coating that inhibits the sticking to the shelf of a rubber stopper pressed against that surface during the application of pressure to the stopper to push the stopper into a container. This coating preferably comprises a hydrophobic or non-wetting material to inhibit the sticking of a stopper to the shelf through any quasi-viscous layer formed between the coating and a stopper when the shelf is pressed against the stopper. An example of a suitable non-wetting material is TEFLON (polytetrafluoroethylene).

The coating may be sprayed on to the surface. This can enable the coating to be retro-fitted to existing freeze dryer shelves by removing the shelves from the chamber of the freeze dryer in which they are located, and applying the coating to a surface of the shelves. Alternatively, the coating may be applied to the shelves in situ.

The coating may be a composite coating of at least two materials. For example, a first layer of ceramic material may be applied to the surface, a second layer of non-wetting material applied to the first layer, and the first and second layers subsequently baked, for example to a temperature in the range from 150 to 350° C., preferably in the range from 200 to 250° C., to form the coating. The first layer may be sprayed on to the surface using one of a thermal spraying and a plasma spraying technique. The ceramic material may comprise one of carbon, tungsten carbide and silicon carbide. During this spraying technique, the temperature of the surface can locally reach temperatures as high as 700° C. In order to avoid warping of the shelf due to material strain relief, a diathermal fluid can be conveyed between the plates during the spraying technique to ensure appropriate cooling.

Alternatively, or additionally, the coating may have a roughness which is greater than that of the surface to which it is applied. Increasing the roughness of the surface of the shelf decreases the contact area between the shelf and the stopper when the stopper is pressed into the container, and thereby reduce the adhesion between the stopper and the container. Furthermore, depending on the degree of roughness, the formation of any vacuum cavities between the shelf and the stopper can be inhibited.

In a second embodiment, rather than applying a coating to the surface to increase the roughness of the surface, the surface itself is roughened to inhibit the sticking to the shelf of a rubber stopper pressed against that surface during the application of pressure to the stopper to push the stopper into a container. The surface may be treated using one of a laser beam, electron beam and chemical etching to remove material from the surface to increase its roughness. Alternatively, material may be deposited or otherwise attached to the surface to increase its roughness. This surface treatment can form a regular surface pattern on the surface in order to provide greater control over the size and/or spacing of the "peaks" in the surface that come into contact with the stopper during the closure procedure. The surface pattern may comprise one of cross hatching, parallel lines and an array of dots. For example, the addition of material to the surface may be performed by attaching a wire mesh to the surface of the shelf to provide a regular pattern of peaks for contacting the stopper. The stopper may be inserted into the container through the application of pressure from only a relatively small, for example two or three peaks, and so in one example the peaks have a period in the range from 2 to 3 mm.

The manufacture of the shelf preferably comprises the steps of locating spacers between the plates to define at least one flow channel for conveying a diathermic fluid between the plates, and attaching the spacers to the plates, wherein the surface treatment is performed following the attachment of the spacers to the plate. The spacers are preferably attached to the plates using an adhesive or using a vacuum brazing technique.

In a second aspect the present invention provides a freeze dryer shelf comprising opposed, parallel first and second plates having at least one flow channel located therebetween for conveying a diathermic fluid between the plates, one of the plates having a surface treated to inhibit the sticking to the shelf of a rubber stopper pressed against that surface during the application of pressure to the stopper to push the stopper into a container.

As discussed above, in one embodiment, the surface has a coating thereon that inhibits the sticking to the shelf of a rubber stopper pressed against that surface during the application of pressure to the stopper to push the stopper into a container. In another embodiment, the surface is roughened to inhibit the sticking to the shelf of a rubber stopper pressed against that surface during the application of pressure to the stopper to push the stopper into a container.

In a third aspect, the present invention provides a freeze dryer comprising chamber housing a plurality of shelves each comprising opposed, parallel first and second plates having at least one flow channel located therebetween for conveying a diathermic fluid between the plates, each shelf having a surface treated to inhibit the sticking to the shelf of a rubber stopper pressed against that surface during the application of pressure to the stopper to push the stopper into a container.

Figure 2:
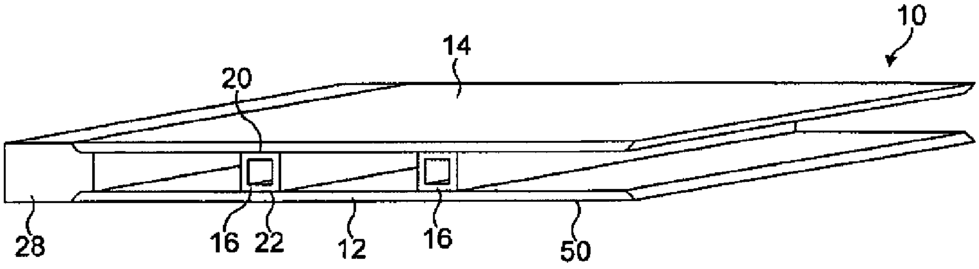
FIG. 2 is a perspective view of part of the shelf of FIG. 1.

With reference to FIGS. 1 and 2, a freeze dryer shelf 10 comprises a pair of first and second plates 12, 14. Both plates are flat, parallel and spaced apart from one another. A plurality of ribs 16 are provided within the space formed between first and second plates 12, 14. The ribs 16 are spaced apart to define at least one flow channel 18 for diathermic fluid conveyed between the first and second plates 12, 14. In this regard, the ribs 16 are substantially parallel and staggered relative to one are another in order to produce a serpentine flow path through the shelf 10, and thereby minimize pressure drop. The ribs 16 are preferably hollow rectangular tubes, although they may take any form having elongated flat surfaces 20, 22 in contact with the first and second plates 12, 14 respectively.

The shelf 10 is peripherally sealed by a frame 24 comprising bars or rods 26, 28, 30, 32 each having a substantially square or rectangular transverse cross-section. The rods are connected end-to-end, and secured to the first and second plates 12, 14. Diathermic fluid flows into and is discharged from the shelf 10 by fluid inlet and outlet ports formed by inlet and outlet pipes 34, 36 connected to inlet and outlet tab portions 38, 40 provided with internal drillings. Diathermic fluid enters into and is discharged from the flow channels 18 through apertures defined in rods 26, 28 and in communication with each of the internal drillings of tab portions 38, 40. Inlet and outlet pipes 34, 36 are connected to hoses which are, in turn, connected to an external circuit for the diathermic fluid which conventionally includes a pump to circulate the diathermic fluid, a refrigerant circuit for cooling the diathermic fluid during the freezing phase of the freeze drying process, and an electrical heater for heating the diathermic fluid during the sublimation phase of the freeze drying process. Support blocks may be provided on the outer periphery of the shelf 10 for receiving support rods for connecting the shelf 10 to other shelves within a chamber of a freeze dryer.

All of the aforementioned components of the freeze dryer shelf 10 are preferably fabricated from stainless steel. To manufacture the shelf 10, the plates 12, 14 may be attached to the ribs 16 using an adhesive, or by brazing. In order to assemble the shelf 10 using a brazing process, a nickel or copper-based powder on a self-adhesive backing or brazing tape is sandwiched between first plate 12 and the lower surfaces 22 of the ribs 16, and between the second plate 14 and the upper surfaces 20 of the ribs 16. The assemblage is sandwiched between graphite blocks or any heat conductive material and placed within a vacuum induction furnace. The assemblage is heated in the furnace at a temperature that ramps from room temperature to within approximately 10° C. of the melting of nickel, approximately 482° C. The temperature is then stabilized and then again ramped up to the melting point of nickel and the crystallization temperature of the stainless steel. This temperature is stabilized for between 15 and 20 minutes in order to stress relieve the assemblage of components. Thereafter, the furnace is cooled down for about 12 hours to 204° C., at which point the entire assemblage is quenched with an inert gas, such as nitrogen. Thereafter, the assemblage is allowed to cool to room temperature. The end plates 30, 32 are then welded to the plates 12, 14, and preferably ground, smoothed, and polished.

Following the assembly of these components of the shelf 10, the exposed (lower as illustrated) surface 50 of the first plate 12 is treated to inhibit the sticking thereto of a rubber stopper pressed against that surface 50 during the application of pressure to the stopper to push the stopper into a container. As described below with reference to FIGS. 3 to 6, the surface 50 of the shelf 10 may be treated in a number of different ways to prevent rubber stoppers from sticking to the shelf 10 during a container closure procedure.

Figure 3:
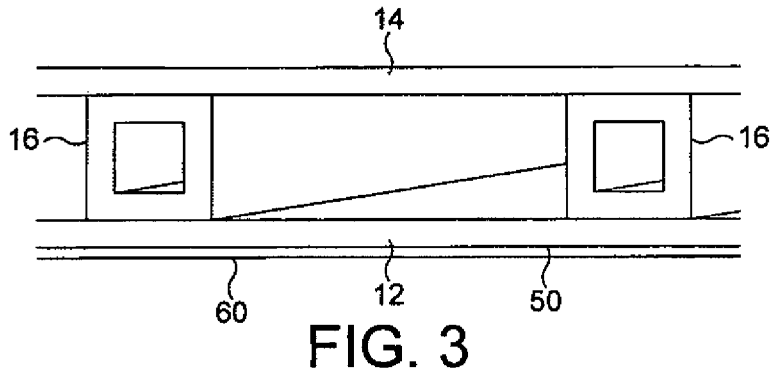
FIG. 3 is a close-up of part of FIG. 2 in a first embodiment of the invention.

In a first embodiment illustrated in FIG. 3, the surface 50 is treated by the formation thereon of a coating 60 that prevents rubber stoppers from sticking to the shelf 10 during a container closure procedure. In this embodiment, the coating is a composite coating of two different materials. A first layer of ceramic material, for example, carbon, tungsten carbide and silicon carbide, is applied to the surface 50 using a thermal spraying and a plasma spraying technique. During this spraying technique, the temperature of the surface 50 can locally reach temperatures as high as 700° C., and so diathermic fluid is preferably conveyed through the shelf 10 during spraying to remove heat from the surface 50 and thereby prevent warping of the shelf Following completion of this spraying of ceramic material on to the surface 50, a second layer of a hydrophobic or non-wetting material, for example TEFLON (polytetrafluoroethylene) is applied to the first layer, and the first and second layers are subsequently baked at a temperature in the range from 150 to 350° C., preferably in the range from 200 to 250° C., to form the coating 60.

The coating 60 may perform two functions. Firstly, this coating can provide a hydrophobic interface that prevents a stopper from sticking to the shelf 10 through any quasi-viscous layer formed between the coating 60 and a stopper when the shelf 10 is pressed against the stopper. Secondly, the coating 60 may have a roughness which is greater than that of the stainless steel surface 50 to which it is applied. Increasing the roughness of the surface of the shelf 10 that comes into contact with stoppers during a container closure procedure can decrease the contact area between the shelf 10 and the stopper when the stopper is pressed into the container, and thereby reduce the adhesion between the stopper and the container. Furthermore, depending on the degree of roughness, the formation of any vacuum cavities between the shelf 10 and the stopper can be inhibited.

Figure 4:
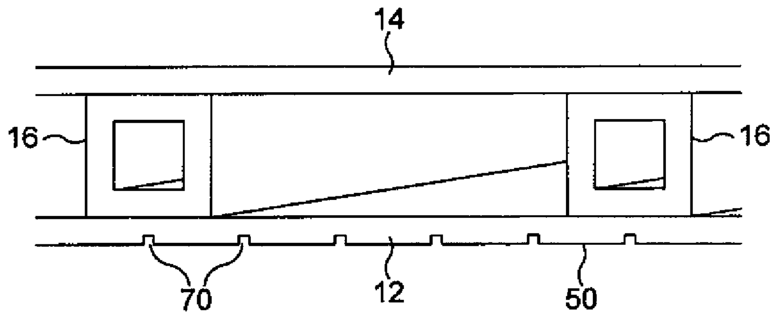
FIG. 4 is a close-up of part of FIG. 2 to illustrate a second embodiment of the invention.
Figure 5:
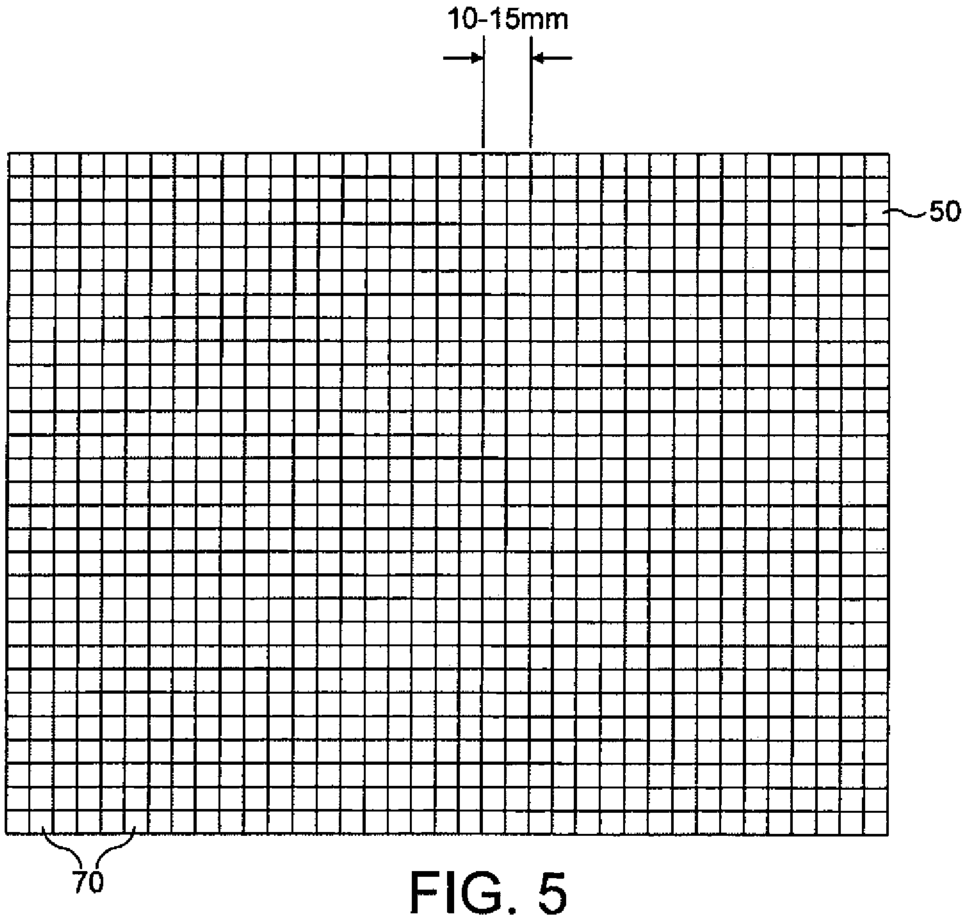
FIG. 5 is a plan view of the exposed surface of plate 12 of the shelf of FIG. 4.

FIGS. 4 and 5 illustrate a second embodiment in which the surface 50 is treated using one of a laser beam, electron beam and chemical etching to remove material from the surface 50, as illustrated by pits 70 in FIG. 4, to increase its roughness and thereby inhibit the sticking to the shelf 10 of a rubber stopper pressed against that surface 50 during a container closure procedure. This surface treatment can form a regular surface pattern 70 on the surface 50 in order to provide control over the size and/or spacing of the "peaks" in the surface 50 that come into contact with the stopper during the closure procedure. The surface pattern may comprise one of cross hatching (as illustrated in FIG. 5), parallel lines and an array of dots. In the example illustrated in FIG. 5, the peaks have a period in the range from 2 to 3 mm.

Figure 6:
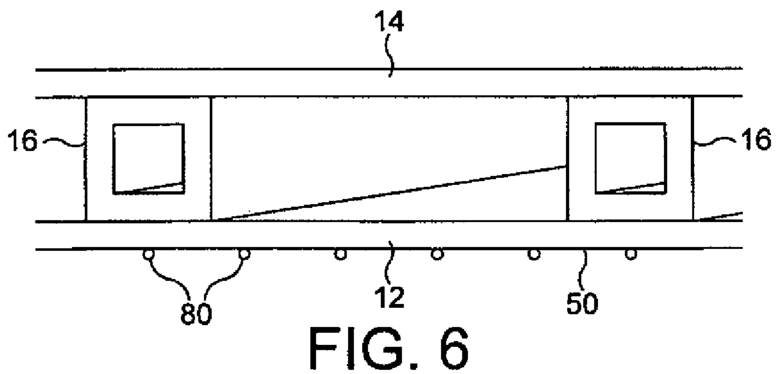
FIG. 6 is a close-up of part of FIG. 2 to illustrate a third embodiment of the invention.

FIG. 6 illustrates a third embodiment in which the surface 50 is roughened by the application thereto of a wire mesh 80, also to increase the roughness of surface 50 and provide control over the size and/or spacing of the peaks in the surface 50 that come into contact with the stopper during the closure procedure.

What is claimed is:

1. A freeze dryer shelf comprising opposed, parallel first and second plates having at least one flow channel located therebetween for conveying a diathermic fluid between the plates, one of the plates having a lower surface roughened to inhibit the sticking of rubber thereto, wherein a wire mesh is applied to the lower surface of the shelf to form the roughened surface, and wherein the shelf further comprises a coating on the roughened surface.

2. The shelf according to claim 1, wherein the coating has a roughness which is greater than that of the lower surface.

3. The shelf according to claim 1, wherein the surface has a regular surface pattern formed thereon.

4. The shelf according to claim 3, wherein the surface pattern comprises one of cross hatching, parallel lines and an array of dots.

5. The shelf according to claim 1, comprising one or more spacers located between the plates to define the at least one flow channel.

6. The shelf according to claim 5, wherein the one or more spacers are attached to the plates using an adhesive or are brazed to the plates.

7. The shelf according to claim 1, wherein the coating includes at least a first layer of ceramic material applied to the roughened surface, and at least a second layer of non-wetting material applied to the first layer, the first and second layers being subsequently baked to form the coating.

8. The shelf according to claim 7, wherein the ceramic material comprises one of carbon, tungsten carbide and silicon carbide, and wherein the non-wetting material being polytetrafluoroethylene.

9. A freeze dryer comprising a chamber housing a plurality of shelves, each shelf comprising opposed, parallel first and second plates having at least one flow channel located therebetween for conveying a diathermic fluid between the plates, one of the plates having a lower surface roughened to inhibit the sticking of rubber thereto, wherein a wire mesh is applied to the lower surface of the shelf to form the roughened surface, and wherein the shelf further comprises a coating on the roughened surface.

* * * * *